United States Patent [19]

Kunimune et al.

[11] Patent Number: 4,923,968
[45] Date of Patent: May 8, 1990

[54] MELT-MOLDABLE CRYSTALLINE POLYIMIDE POLYMER

[75] Inventors: Kouichi Kunimune, Chibaken; Kazutsune Kikuta, Yokohamashi; Takao Kawamoto, Kawasakishi; Shiro Konotsune, Yokosukashi, all of Japan

[73] Assignee: Chisso Corporation, Osaka, Japan

[21] Appl. No.: 217,302

[22] Filed: Jul. 11, 1988

[51] Int. Cl.$^5$ .............................................. C08G 69/26
[52] U.S. Cl. .................................... 528/353; 528/125; 528/126; 528/128; 528/170; 528/172; 528/173; 528/352
[58] Field of Search ............... 528/353, 352, 170, 125, 528/126, 128, 172, 173

[56] References Cited

U.S. PATENT DOCUMENTS 3,998,786 12/1976 D'Alelio ............................. 528/170
4,316,844 2/1982 Waitkus et al. ..................... 528/185

Primary Examiner—John Kight
Assistant Examiner—M. L. Moore

Attorney, Agent, or Firm—Fred Philpitt

[57] ABSTRACT

A crystalline polyimide polymer having a practical effectiveness that extrusion or injection molding which has so far been applied to thermoplastic resins, but could not have been achieved by conventional polyimides, are possible due to its melting point in the range of 300° C. to 450° C., and a process for producing the polymer, are provided, which polyimide polymer contains the following imide repetition unit (I) in 30% by mol based on the polymer and containing or not containing at least one of other imide repetition units and also having an inherent viscosity of 0.1 to 5 dl/g in conc. sulfuric acid at 30±0.01° C.:

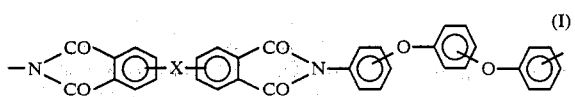

wherein X is divalent CO, divalent SO$_2$ group, S, O or a single bond.

5 Claims, 1 Drawing Sheet

MELT-MOLDABLE CRYSTALLINE POLYIMIDE POLYMER

BACKGROUND OF THE INVENTION

1. Field of the Invention

This invention relates to a melt-moldable crystalline polyimide polymer and a process for producing the same.

2. Description of the Related Art

In general, since polyimides are organic high-molecular weight compounds having a high heat resistance and also superior electrical characteristics and mechanical characteristics, they have been broadly used as protecting materials, insulating materials, in the field of electronic equipments and also adhesives, films, structural units, etc. However, conventional polyimides have high melting points or glass transition points and these temperatures often exceed their thermal decomposition temperatures or are close thereto; hence it has generally been difficult to subject them to melt-molding. Thus, as current molding processes for polyimides, molding processes for thermosetting resins have been mostly employed such as processes for coating and baking a precursor solution of polyimides or a soluble polyimide solution or processes for subjecting powdery polyimide polymers to compression molding, etc. Accordingly, if a polyimide polymer to which extrusion molding or injection molding as molding processes for thermoplastic resins is applicable is obtained, it is possible to improve the productivity of polyimide molded products and also obtain various molded products therefrom; hence the economical effect will be great. Thus, meltable polyimide polymers have often been proposed. For example, U.S. Pat. No. 4558110 discloses a crystalline silicone imide copolymer. However, this copolymer has a m.p. of 140°-210° C. according to its Examples; hence it cannot help regarding the copolymer as having improved its process ability at the cost of its heat resistance specific of polyimides. Further, European patent application publication No. 200204 discloses a specific pyromellitic imide copolymer as a meltable polyimide copolymer, and also discloses that the copolymer is moldable into film by melt-press at 400° C., and an effectiveness brought about thereby, but its melting point is not shown and whether the copolymer is crystalline or not is unclear. As described above, industrial need for high-temperature-meltable, preferably commercially melt-moldable polyimide polymers is great, but it is the present status that such polymers are still being groped for. Commercially melt-moldable polyimide polymers referred to herein mean those generally having a melting point lower by about 50° C. than the thermal decomposition temperature thereof.

SUMMARY OF THE INVENTION

The object of the present invention is to provide a crystalline polyimide polymer having heat resistance and also having a melting point which is commercially melt-moldable at the highest.

The present invention in the first aspect resides in:

a melt-moldable crystalline polyimide polymer containing the following imide repetition unit (I) in 30% by mol or more based on the polymer, and containing or not containing at least one of other imide repetition units and also having an inherent viscosity of 0.1 to 5 dl/g as measured in a concentration thereof of 0.5 g/dl in concentrated sulfuric acid at a temperature of $30 \pm 0.01°$ C.:

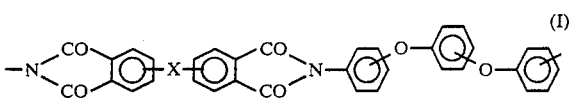

(I)

wherein X represents a member selected from the group consisting of divalent CO group, $SO_2$ group, S atom, O atom and a single bond.

The present invention in the second aspect resides in the following process:

a process for producing a crystalline polyimide polymer which comprises feeding into a reaction vessel, $A^1$ mols of at least one of diacid anhydride compounds expressed by the following formula (VIII) and $A^2$ mols of at least one of diacid anhydride compounds expressed by the following formula (IX) and $B^1$ mols of at least one of diamine compounds expressed by the following formula (X) and $B^2$ mols of at least one of diamine compounds expressed by the following formula (XI), together or in divided manner; reacting these components at a temperature of 0° to 200° C. for 0.2 to 20 hours in the presence of a solvent so as to give a relationship between $A^1$ and $A^2$ expressed by the following expression (XII) and that between $B^1$ and $B^2$ expressed by the following expression (XIII), and also so that at least 30% by mol based on the total mols of the diacid anhydrides, of at least one of compounds expressed by the formula (VIII) can be reacted with at least 30% by mol based on the total mols of the diamines, of at least one of compounds expressed by the formula (X); and heating the resulting polyimide precursor to a temperature of 100° to 400° C. to imidize it, or adding to a solution of the precursor, an acid anhydride such as acetic anhydride and/or pyridine or isoquinoline each as a known agent for imidization and imidizing the precursor at a relatively low temperature of 10° to 100° C., to obtain a crystalline polyimide polymer containing the repetition unit (I) as set forth in the first aspect of the present invention in 30% by mol or more based on the polymer and containing or not containing at least one of other imide repetition units and also having an inherent viscosity of 0.1 to 5 dl/g as measured in a concentration thereof of 0.5 g/dl in concentrated sulfuric acid at a temperature of $30 \pm 0.01°$ C.:

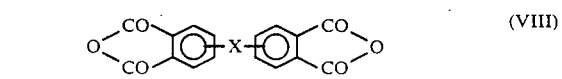

(VIII)

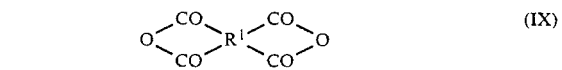

(IX)

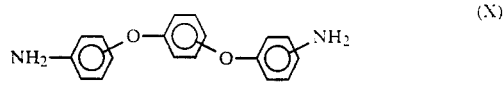

(X)

$$H_2N-R^2-NH_2 \quad (XI)$$

$$100 \geq \frac{A^1}{A^1 + A^2} \times 100 \geq 30 \quad (XII)$$

$$100 \geq \frac{B^1}{B^1 + B^2} \times 100 \geq 30 \quad (XIII)$$

-continued (I)

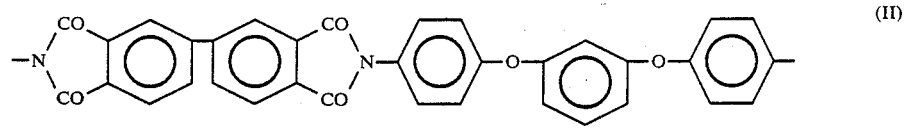
(II)

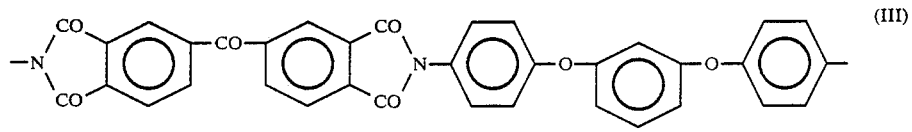
(III)

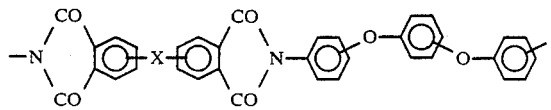

wherein X is an defined in the first aspect of the present invention, $R^1$ represents a tetravalent group excluding a group expressed by the formula

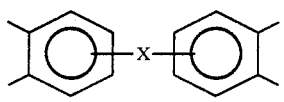

and $R^2$ represents a divalent organic group excluding a group expressed by the formula

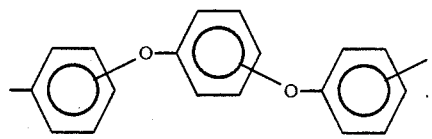

DETAILED DESCRIPTION OF PREFERRED EMBODIMENTS

Figure 1:
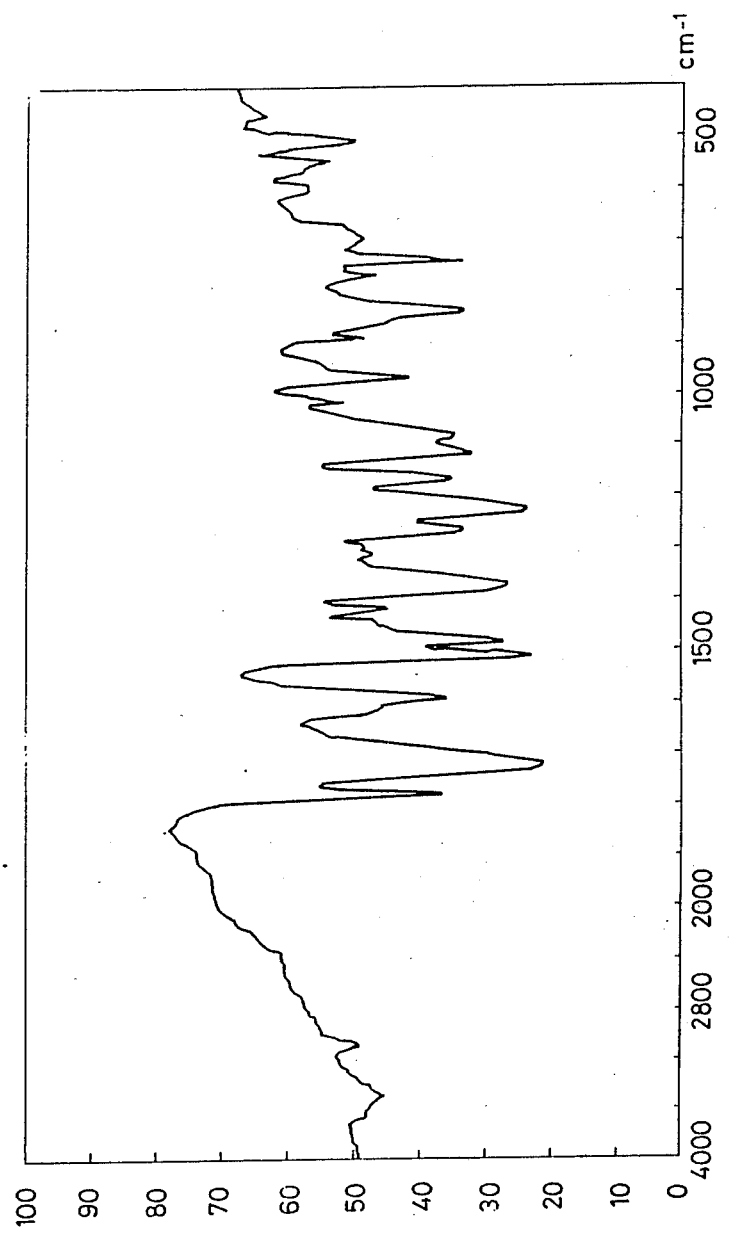
FIG. 1 shows the infrared absorption spectra of a polymer obtained in Example 1.

The average molecular weight of the polyimide polymer of the present invention refers to that corresponding to an inherent viscosity within a range of 0.1 to 5 dl/g as measured under the above-mentioned specified conditions. The above inherent viscosity ($\eta$ inh) referred to in the present invention is as defined under the above measurement conditions, and more particularly it is expressed by the equation $$\eta \text{ inh} = \frac{\ln \eta/\eta_0}{C}$$

wherein $\eta$ represents a value obtained by measuring a polymer in its concentration of 0.5 g/dl in concentrated sulfuric acid at a temperature of 30±0.01° C. by means of Ubbellohde viscometer; $\eta_0$ represents a value obtained by measuring concentrated sulfuric acid at the same temperature by means of Ubbellohde viscometer; and C represents 0.5 g/dl.

Among the above imide repetition unit of the formula (I), particularly at least one kind of imide repetition units expressed by the following formulas (II) and (III) is preferred:

since use of such repetition units reduces the melting point of the polyimide polymer of the present invention, the endothermic peak as measured by means of a differential scanning calorimeter is sharply deep and the polymer has a high crystallinity.

The imide repetition unit expressed by the formula (I) is preferred to be contained in 30 to 100% by mol in the polymer of the present invention. If the percentage is lower than 30% by mol, it is difficult to obtain polymers having melting points lower than 450° C.

The above-mentioned "other imide repetition units" have no particular limitation, but they are generally expressed by the following formula (VI):

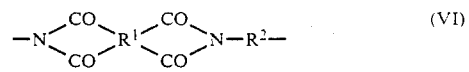
(VI)

wherein $R^1$ represents a tetravalent organic group and $R^2$ represents a divalent organic group, and the formula (IV) excludes the structure expressed by the formula (I).

In more concrete examples thereof, $R^1$ represents a tetravalent carbon cyclic aromatic group or alicyclic group and $R^2$ represents an aliphatic group of 2 to 12 carbon atoms, an alicyclic group of 4 to 30 carbon atoms, an araliphatic group of 7 to 30 carbon atoms, a carbon cyclic aromatic group of 6 to 30 carbon atoms, a polysiloxane group expressed by the formula

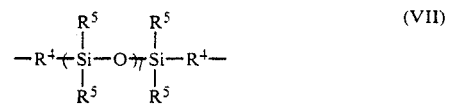
(VII)

wherein $R^4$ independently represents

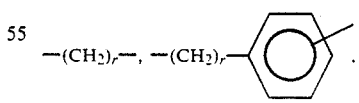

wherein r represents an integer of 1 to 4, $R^5$ independently represents an alkyl group of 1 to 6 carbon atoms, phenyl group or an alkyl-substituted phenyl group of 7 to 12 carbon atoms and l represents a value of $1 \leq l \leq 100$, or a group expressed by the formula

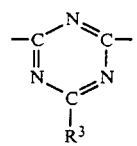
wherein R³ represents an aliphatic group, an araliphatic group each of 8 carbon atoms or less or hydrogen atom, the above-exemplified "other imide repetition units" excluding the imide repetition unit expressed by the formula (I).
Still more concrete examples of "other imide repetition units" are as follows:
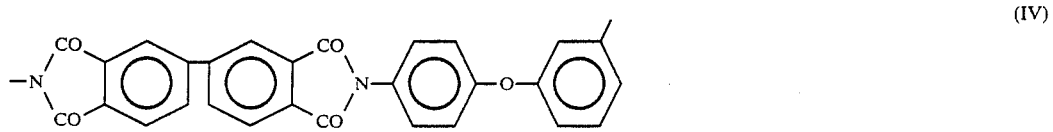 (IV)
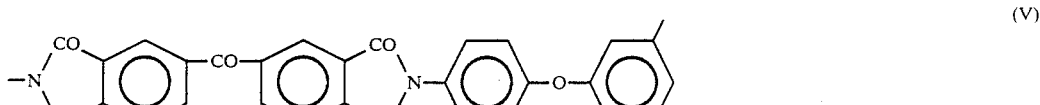 (V)
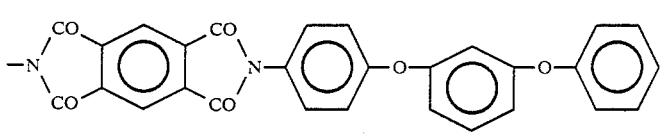
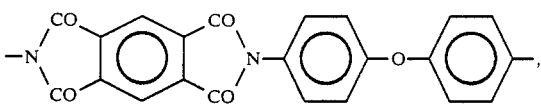
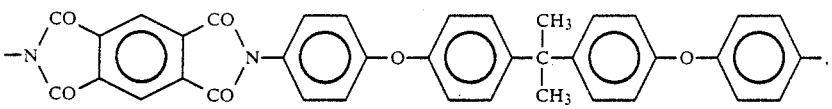
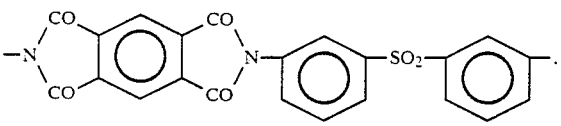
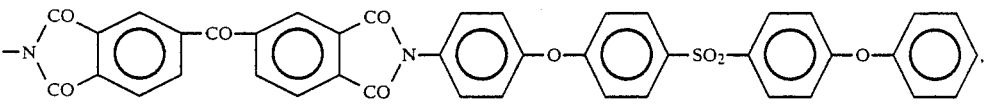
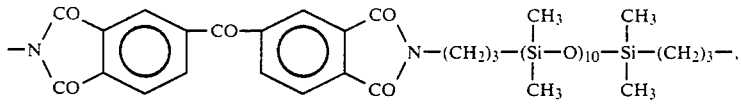
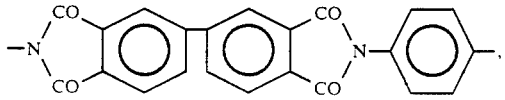
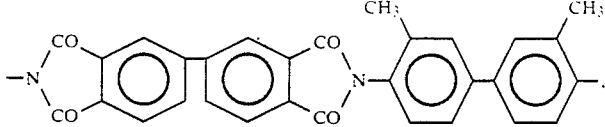
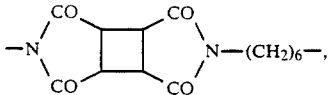

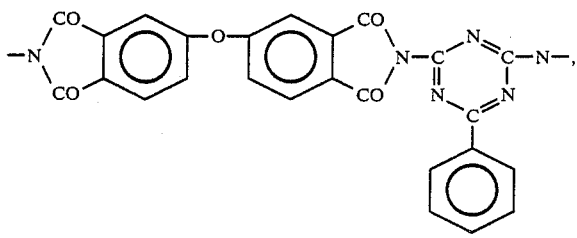

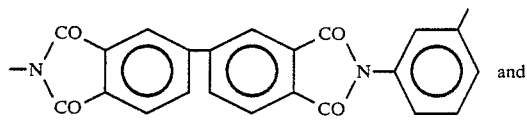 and

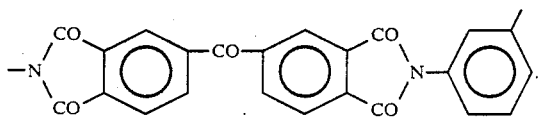

Among these, the units (IV) and (V) have a particularly large effect of reducing the melting point of the resulting polymers.

The polymers of the present invention are preferred to have a melting point of 300°–450° C., preferably 300 to 350° C. If the melting point is lower than 300° C., the resulting polymers have a low heat resistance and hence are less valuable, while if it exceeds 450° C., the resulting polymers cause thermal decomposition. If the melting point exceeds 390° C., it is necessary to carry out melt-molding at a temperature close to the thermal decomposition thereof so that commercial melt-molding becomes difficult.

Next, preparation of the polyimide polymers of the present invention will be described.

Examples of the compounds expressed by the above formula (VIII) are

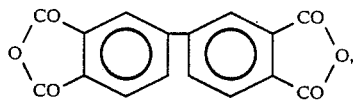

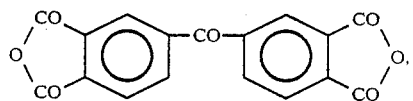

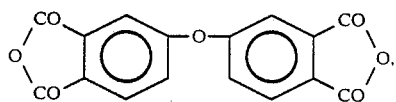

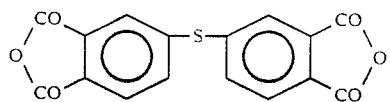

and

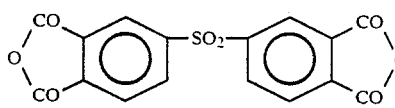

Further, examples of the compounds expressed by the above formula (X) are

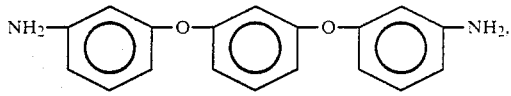

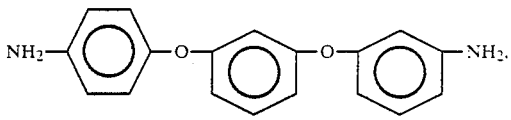

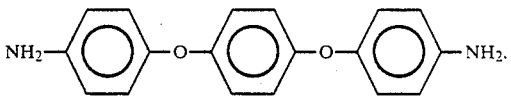

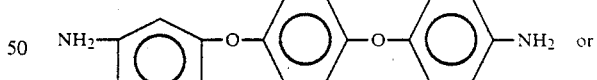 or

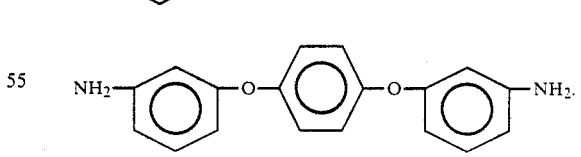

When at least one member of these diacid anhydrides and at least one member of these diamines are reacted as above in a nearly equimolecular ratio, it is possible to obtain a segment consisting only of the repetition unit of the formula (I). In this case, if a member of the diacid anhydrides and a member of the amines are used, a homopolymer is obtained, while if two or more members of the diacid anhydrides and/or two or more members of the amines are used, random copolymers, block copolymers, etc. are obtained, but even in any bonding forms, it is possible to obtain the polymers of the present invention.

Next, in order to produce a polyimide copolymer comprising the repetition unit of the formula (I) and also other imide repetition units, at least one member of diacid anhydrides other than the above-mentioned diacid anhydrides such as pyromellitic dianhydride and/or at least one member of diamines other than the above-mentioned diamines such as 4,4'-diaminodiphenyl ether, 3,4'-diaminodiphenyl ether, 4,4'-diaminodiphenylmethane, 3,3'-diaminodiphenyl sulfone, 2,2-bis[4-(4-aminophenoxy)phenyl]propane, bis[4-(4-aminophenoxy)phenyl] sulfone, etc. may be added to the above-mentioned diacid anhydrides and diamines and the mixture may be reacted together. Among these other diamines, addition of 3,4'-diaminodiphenyl ether particularly has a notable effect upon reduction in melting point. The imide repetition unit expressed by the formula (I) and imide repetition units other than the above may be bonded to each other either in block manner or random manner.

In an embodiment of preparation of such copolymers, there is a process wherein 30% by mol or more based on the total diamines, of at least one of compounds expressed by the formula (X) is reacted with 30% by mol or more based on the total diacid anhydrides, of at least one of compounds expressed by the formula (VIII), followed by feeding to the resulting reaction liquid, at least one of diamines expressed by the formula (XI) and at least one of diacid anhydrides expressed by the formula (IX) and reacting these to obtain the precursor and imidize it.

In another embodiment, there is a process wherein 30% by mol or more based on the total diamines, of at least one of compounds expressed by the formula (X) is reacted with an almost equimolecular quantity to the above, of at least one of compounds expressed by the formula (VIII), followed by feeding to the resulting solution, at least one of diamines expressed by the formula (XI) and at least one of diacid anhydrides expressed by the formula (VIII) and reacting these to obtain a precursor and imidize it.

In still another embodiment, there is a process wherein at least one of diacid anhydrides expressed by the formula (VIII) is fed into a mixed solution of 30% by mol or more based on the total diamines, of at least one of compounds expressed by the formula (X) with at least one of compounds expressed by the formula (XI), followed by reacting these to obtain a precursor and imidize it.

In further another embodiment, there is a process wherein a mixture of 30% by mol or more based on the total diacid anhydrides, of at least one of compounds expressed by the formula (VIII) with at least one of compounds expressed by the formula (IX) is fed into a solution of at least one of diamines expressed by the formula (X), followed by reacting these to obtain a precursor and imidize it.

Further, by repeating these operations with different raw materials, it is also possible to obtain multi-block copolymers.

Among the embodiments of the present invention, those of preparation of copolymers have been illustrated above, but the present invention should not be construed to be limited thereto.

In the process of the present invention, whatever polymerization process is employed, it is preferred that the quantity of the total diacid anhydrides and that of the total amines be almost equimolecular, whereby polymers having a high-molecular weight are easily obtained.

According to the present invention, by preparing polyimides using a combination of particular polynuclear diacid anhydrides and polynuclear ethers, there are obtained crystalline polyimides having a melting point in the range of 300° to 450° C., preferably 300° to 390° C., which is a practically highly valuable temperature range, without reducing heat resistance so much. Combinations of 3,4,3',4'-biphenyltetracarboxylic acid dianhydrige or 3,4,3',4'-benzophenonetetracarboxylic acid dianhydride as the diacid anhydride with 1,3-bis(4-aminophenoxy)benzene as the diamine are particularly preferred, and in order to further reduce the melting point, two members or more of diacid anhydrides and/or two members or more of diamines may be combined to prepare random copolymers thereof. Among these combinations, a combination of 3,4,3',4'-biphenyltetracarboxylic acid dianhydride, 3,4,3',4'-benzophenonetetracarboxylic acid dianhydride and 1,3-bis(4-aminophenoxy)benzene is particularly preferred.

The present invention will be described in more detail by way of Examples and Comparative examples.

EXAMPLE 1

A 1 l flask equipped with a stirrer, a dropping funnel, a thermometer, a condenser and a nitrogen gas purging means was fixed in a constant temperature bath. After purging the inside of the flask with nitrogen gas, dehydrated and purified N-methyl-2-pyrrolidone (500 ml) and 1,3-bis(4-aminophenoxy)benzene (45.29 g) were fed into the flask, followed by dissolving these together with stirring, gradually adding to the resulting solution, 3,4,3',4'-biphenyltetracarboxylic acid dianhydride (45.59 g) through the dropping funnel over 30 minutes to carry out reaction. During the period, the reaction temperature was 20° to 30° C. The reaction was further continued at this temperature for 10 hours to obtain a viscous varnish. This varnish was fed into a large quantity of acetone and the resulting deposited powder was filtered off to obtain a polyamic acid powder. This powder was heated in an oven at 300° C. for one hour to obtain a polyimide polymer. This polymer exhibited a sharp endothermic peak at 402° C. in the measurement of melting point by means of a differential scanning calorimeter and melted at the temperature. The fact that the melting point was exhibited as above evidences that this polymer is crystalline. Further, the inherent viscosity of this polymer in concentrated sulfuric acid was 1.8 dl/g. The infrared absorption spectra of this polymer are shown in FIG. 1.

The above measurement of the melting point by means of a differential scanning calorimeter was carried out by using DSC-1500M (tradename of differential scanning calorimeter manufactured by Shinku Riko Company), raising the temperature at a rate of 5° C./min. and reading the top of the endothermic peak to render the reading as the melting point. This applies also to the succeeding Examples.

EXAMPLE 2

Example 1 was repeated except that 3,4,3',4'-benzophenonetetracarboxylic acid anhydride (47.65 g) as a diacid anhydride and 1,3-bis(4-aminophenoxy)benzene (43.23 g) as a diamine were used, to obtain a viscous varnish. This varnish was treated in the same manner as in Example 1. The resulting polyimide pojymer has a m.p. of 422° C. as measured by the differential scanning calorimeter and an inherent viscosity of 1.1 dl/g in conc. sulfuric acid.

EXAMPLE 3

Example 1 was repeated except that to a solution obtained by dissolving 1,3-bis(4-aminophenoxy)benzene (44.24 g) as a diamine in N-methyl-2-pyrrolidone (500 ml) were added 3,4,3',4'-biphenyltetracarboxylic acid dianhydride (22.26 g) and 3,4,3',4'-benzophenonetetracarboxylic acid dianhydride (24.38 g) each as a diacid anhydride each over 30 minutes, to obtain a viscous vanish. This varnish was treated as in Example 1 to obtain a polyimide polymer of the present invention having a m.p. of 327° C. as measured by means of the differential scanning calorimeter and an inherent viscosity of 1.4 dl/g in conc. sulfuric acid.

EXAMPLE 4

Reaction and treatment were carried out in the same manner as in Example 3 except that 1,3-bis(4-aminophenoxy)benzene (44.65 g)(0.1528 mol) as a diamine ard 3,4,3',4'-biphenyl-tetracarboxylic acid dianhydride (31.46 g) (0.1069 mol) and 3,4,3',4'-benzophenonetetracarboxylic acid dianhydride (14.77 g) (0.04584 mol), each as a diacid anhydride were used. The resulting polyimide polymer of the present invention had a melting point of 338° C. as measured by the differential scanning calorimeter and an inherent viscosity of 1.7 dl/g in conc. sulfuric acid.

EXAMPLE 5

Reaction was carried out in the same manner as in Example 1 except that 1,3-bis(4-aminophenoxy)benzene (20.23 g) and bis[4-(4-aminophenoxy)phenyl] sulfone (29.93 g), each as a diamine, were dissolved in N-methyl-2-pyrrolidone (500 ml), followed by adding to the solution, 3,4,3',4'-biphenyltetracarboxylic acid dianhydride (40.72 g) as a diacid anhydride over 30 minutes, to obtain a viscous varnish. This varnish was added with stirring to a solution obtained by dissolving isoquinoline (4 g) and acetic anhydride (60 g) in N-methyl-2-pyrrolidone (1 l), followed by subjecting the mixture to imidization reaction at 20° to 30° C. for one hour to obtain a powdery polyimide polymer. This powder was filtered off, followed by drying it in an oven at 200° C. for one hour and measuring its physical properties. This polymer had a m.p. of 405° C. as measured by by the differential scanning calorimeter and an inherent viscosuty of 0.5 dl/g in conc. sulfuric acid.

EXAMPLE 6

Reaction was carried out in the same manner as in Example 1 except that 1,3-bis(4-aminophenoxy)benzene (24.58 g) and 4,4'-diaminodiphenyl ether (16.83 g), each as a diamine, were dissolved in N-methyl-2pyrrolidone (500 ml), followed by adding to the solution, 3,4,3',4'-biphenyltetracarboxylic acid dianhydride (49.47 g) as a diacid anhydride, to obtain a viscous varnish. This varnish was uniformly applied onto an aluminum plate by means of a coater having a distance of 10 mils kept, followed by heating the resulting material in an oven at 100° C. for one hour and successively at 300° C. for one hour to form a thin film of a polyimide polymer of the present invention. This thin film was scraped off and subjected to measurement of physical properties. The polymer had a melting point of 388° C. as measured by the differential scanning calorimeter and an inherent viscosity of 2.5 dl/g in conc. sulfuric acid.

EXAMPLE 7

Reaction was carried out in the same manner as in Example 1 except that 1,3-bis(4-aminophenoxy)benzene (48.44 g) as a diamine was dissolved in N-methyl-2-pyrrolidone (500 ml), followed by keeping the solution at 20° to 30° C., adding to this solution, firstly pyromellitic acid dianhydride (18.07 g) as a diacid anhydride over 30 minutes, reacting the mixture for 2 hours, further adding 3,4,3',4'-biphenyltetracarboxylic acid dianhydride (24.38 g) over 30 minutes and reacting the mixture for 10 hours, to obtain a viscous varnish, which was then treated in the same manner as in Example 1, to obtain a polyimide polymer having a m.p. of 410° C. as measured by the differential scanning calorimeter and an inherent viscosity of 1.5 dl/g in conc. sulfuric acid.

EXAMPLE 8

Example 1 was repeated except that 3,4,3',4'-biphenyltetracarboxylic acid dianhydride (45.59 g) as a diacid anhydride and 1,4-bis(4-aminophenoxy) benzene (45.29 g) as a diamine were used, to obtain a polymer. This polymer had a m.p. of 440° C. as measured by the differential scanning calorimeter and an inherent viscosity of 2.1 dl/g in conc. sulfuric acid.

EXAMPLES 9-11

Various polyimide copolymers were prepared using raw materials indicated in Table 1 in N-methyl-2pyrrolidone (500 ml), and the copolymers were treated in the same manner as in Example 1 and subjected to measurement of physical properties. The results are shown in Table 1.

TABLE 1

|  |  | Example 9 | Example 10 | Example 11 |
|---|---|---|---|---|
| Raw material*1 | S-BPDA (g) | 48.62 | — | 42.51 |
| Diacid anhydride | BTDA (g) | — | 48.37 | 5.82 |
| Raw material*2 | TPE-R (g) | 29.03 | 39.52 | 31.71 |
| Diamine | 3 · 4'-DDE (g) | 13.23 | 3.00 | 10.84 |
| M.P. | (°C.) | 343 | 415 | 340 |
| Inherent viscosity | (dl/g) | 1.6 | 1.1 | 1.6 |

*1S-BPDA: 3,4,3',4'-biphenyltetracarboxylic acid dianhydride
BTDA: 3,4,3',4'-benzophenonetetracarboxylic acid dianhydride
*2TPE-R: 1,3-bis(4-aminophenoxy)benzene
3,4'-DDE: 3,4'-diaminodiphenyl ether

COMPARATIVE EXAMPLE 1

Reaction was carried out in the same manner as in Example 1 except that 3,4,3',4'-biphenyltetracarboxylic acid dianhydride (66.46 g) as a diacid anhydride and p-phenylenediamine (24.42 g) as a diamine were used, followed by post-treatment, to obtain a polyimide polymer powder. This polymer had an inherent viscosity of 2.0 dl/g in conc. sulfuric acid, but exhibited no melting point at 450° C. or lower as measured by the differential scanning calorimeter and caused notable decomposition when the temperature was raised above 450° C.

COMPARATIVE EXAMPLE 2

Reaction was carried out in the same manner as in Example 1 except that pyromellitic acid dianhydride (47. 39 g) as a diacid anhydride and 4,4'-diaminodiphenyl ether (43.50 g) as a diamine were used, followed by posttreatment to obtain a polyimide polymer powder. This polymer had an inherent viscosity of 1.5 dl/g in conc. sulfuric acid, but exhibited no melting point at 450° C. or lower as measured by the differential scanning calorimeter and caused notable decomposition when the temperature was raised above 450° C.

COMPARATIVE EXAMPLE 3

Reaction was carried out in the same manner as in Example 1 except that pyromellitic acid dianhydride (38.83 g) as a diacid anhydride and 1,3-bis(4-aminophenoxy)benzene (52.05 g) as a diamine were used, followed by post-treatment to obtain a polyimide polymer powder. This polymer had an inherent viscosity of 1.7 dl/g in conc. sulfuric acid, but exhibited no melting point at 450° C. or lower and caused notable decomposition when the temperature was raised above 450° C. Further, separately when the polymer powder was heated on a hot plate and observed, neither fusion nor flow occurred at temperatures up to 450° C.

EXAMPLES 12 to 16 AND COMPARATIVE EXAMPLE 4

Using the same apparatus and procedure as in Example 1, various polyimide copolymers were prepared in N-methyl-2pyrrolidone (500 ml), and treatment was carried out in the same manner as in Example 1. The results are shown in Table 2.

However, in Example 13, S-BPDA was reacted with TPE-R at 20° to 30° C. for 10 hours, followed by adding BTDA and m-phenylenediamine and reacting the resulting mixture at the same temperature and for the same hour.

Further, in Example 16, S-BPDA was reacted with TPE-R at 20° to 30° C. for 10 hours, followed by adding BTDA and 3,4'-DDE and reacting the resulting mixture at the same temperature and for the same time.

1. A melt-moldable, crystalline polyimide polymer comprising the following imide reptition unit (II) in 30% by mol or more based on the polymer, and also comprising at least one member selected from the group consisting of the following imide repetition units (III), (IV), (V), (XIV), (XV) and (XVI)
   and also having an inherent viscosity of 0.1 to 5 dl/g as measured in a concentration thereof of 0.5 g/dl in concentrated sulfuric acid at a temperature of 30±0.01° C.,
   and further having a melting point of 300° to 390° C. as measured by means of a differential scanning calorimeter:

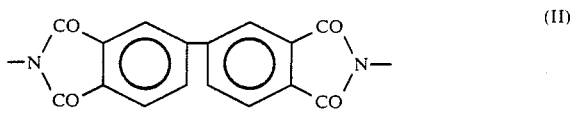

(II)

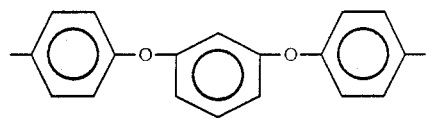

(III)

(IV)

TABLE 2

|  |  | Example 12 | Example 13 | Example 14 | Example 15 | Example 16 | Comp. ex. 4 |
|---|---|---|---|---|---|---|---|
| Raw material diacid anhydride | S-BPDA (g) | 48.64 (0.165) | 30.61 (0.104) | 50.33 (0.171) | 19.51 (0.0663) | 46.31 (0.157) | 53.69 (0.167) |
|  | BTDA (g) |  |  | 22.35 (0.0694) | 32.05 (0.0995) |  |  |
| Raw material diamine[*2] | TPE-R (g) | 29.00 (0.0992) | 30.41 (0.104) | 25.00 (0.0855) | 19.38 (0.0663) | 43.71 (0.150) |  |
|  | m-PDA (g) |  | 7.50 (0.0694) |  |  | 0.851 (0.00787) |  |
|  | 3,4'-DDE(g) | 13.24 (0.0661) |  | 13.70 (0.0684) | 19.91 (0.0995) |  |  |
|  | p-PDA (g) |  |  | 1.85 (0.0171) |  |  |  |
|  | DAPB-3,3(g) |  |  |  |  |  | 12.18 (0.0417) |
|  | DDE (g) |  |  |  |  |  | 25.02 (0.125) |
| M. P. (°C.) |  | 338 | 316 | 336 | 323 | 388 | None |
| Inherent viscosity (dl/g) |  | 0.5 | 0.3 | 1.3 | 1.1 | 1.0 | 0.8 |

[*1]Numerals inside the parenthese mean the number of mols.
[*2]m-PDA: m-phenylenediamine. p-PDA: p-phenylenediamine
DAPB-3,3: 1,3-di(3-aminophenoxy)benzene. DDE: 4,4'-diaminodiphenyl ether Since the polyimide polymer of the present invention has a melting point in the temperature range of 300° to 450° C., preferably 300° to 390° C., which range is practically highly valuable, the polymer has a practical effectiveness that extrusion molding or injection molding which has so far been applied to thermoplastic resins, but could not have been achieved by conventional polyimides has become possible. Further, the heat resistance of the polymer is not reduced so much as compared with conventional polylmides.

What we claim is:

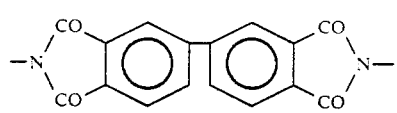

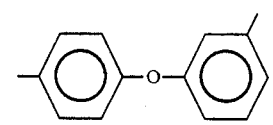

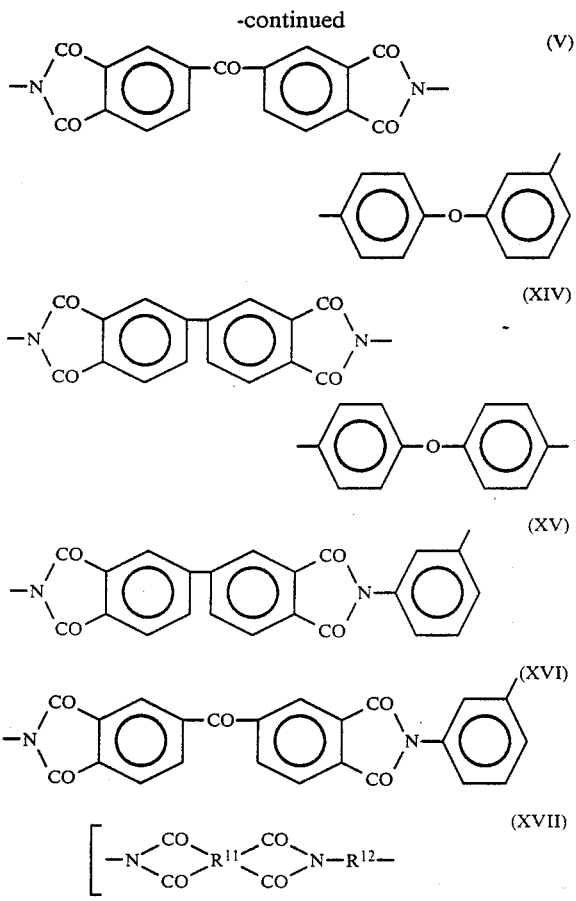

wherein $R^{11}$ represents a tetravalent organic group; $R^{12}$ represents a divalent organic group; and the imide repetition unit of the formula (XVII) does not contain any of the imide repetition units of the formulas (II), (III), (IV), (V), (XIV), (XV) and (XVI).

2. A melt-moldable, crystalline polyimide polymer according to claim 1 wherein said polymer comprises said imide repetition unit (II) in 30 to 95% by mol based thereon, and said at least one member of said imide repetition units of (III), (IV), (V), (XIV), (XV) and (XVI) in 70 to 5% by mol based thereon.

3. Melt-moldable, crystalline polyimide polymer according to claim 1 wherein said polymer comprises said imide repetition unit (II) in 30 to 70% by mol based on the polymer, and at least one member of said imide repetition units of (III), (IV), (V) and (XIV) in 70 to 30% by mol; and said melting point is 388° C. or lower.

4. A polyimide polymer according to claim 1 which also comprises the imide repetition unit

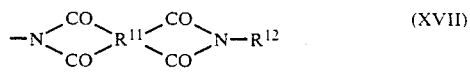

where in $R^{11}$ represents a tetravalent organic group; $R^{12}$ represents a divalent organic group; and the imide repetition units of the formula (XVII) does not contain any of the imide repetition units of the formulas (II), (III), (IV), (V), (XIV), (XV) and (XVI).

5. A process for producing a crystalline polyimide polymer which comprises feeding into a reaction vessel, $A^1$ mols of at least one diacid anhydride compound having the following formula (vIII), $A^2$ mols of at least one diacid anhydride compound having the following formula (IX), $B^1$ mols of at least one diamine compound having the following formula (X), $B^2$ mols of at least one of diamine compound having the following formula (XI), together or in a divided manner; reacting these components at a temperature of 0° to 200° C. for 0.2 to 20 hours in the presence of a solvent so as to give a relationship between $A^1$ and $A^2$ as indicated by (XII) and a relationship between $B^1$ and $B^2$ as indicated by (XIII), and also so that at least 30% by mol based on the total mols of the diacid anhydrides, of at least one of the compounds expressed by the formula (VIII) can be reacted with at least 30% by mol based on the total mols of the diamines, of at least one of the compounds expressed by the formula (X); and imidizing the resulting polyimide precursor to obtain a crystalline polyimide polymer containing the following repetition unit (I) in 30% by mol or more based on the polymer and also having an inherent viscosity of 0.1 to 5 dl/g as measured in a concentration thereof of 0.5 g/dl in concentrated sulfuric acid at a temperature of 30±0.01° C.:

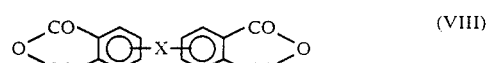

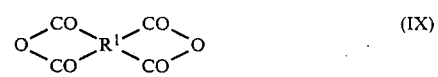

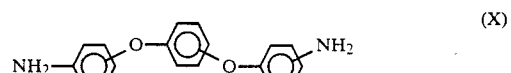

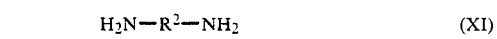

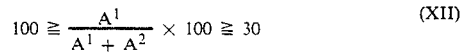

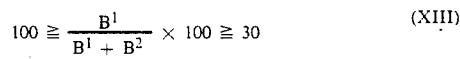

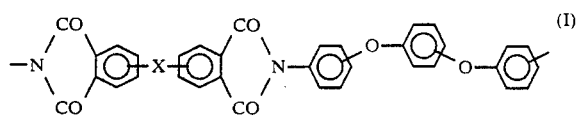

wherein X represents a member selected from the group consisting of divalent CO group, $SO_2$ group, S atom, O atom and a single bond, $R^1$ represents a tetravalent group excluding a group expressed by the formula

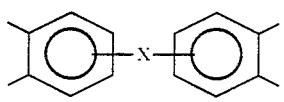

and $R^2$ represents a divalent organic group excluding a group expressed by the formula

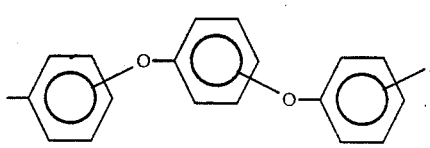

* * * * *